Nov. 26, 1935.   W. R. GRISWOLD   2,021,935

MOTOR VEHICLE

Filed Aug. 18, 1933

Inventor
WALTER R. GRISWOLD.

By
Attorney

Patented Nov. 26, 1935

2,021,935

UNITED STATES PATENT OFFICE 2,021,935

MOTOR VEHICLE

Walter R. Griswold, Detroit, Mich., assignor to Packard Motor Car Company, Detroit, Mich., a corporation of Michigan Application August 18, 1933, Serial No. 685,715

4 Claims. (Cl. 74—397)

In the production of high class motor vehicles, the requirement of quiet transmission mechanism has resulted in the adoption of helical gears instead of the commonly used spur gears. Spur gears create so much noise in their operation that back lash noise passes unnoticed. With helical gears, however, the operation is so quiet that back lash beyond a certain limit creates noise which is noticeable and consequently extreme care must be used in fabrication of the gears and in the matching of gear sets used in a transmission if offensive back lash noise is to be eliminated. Due to the human element involved in the fabrication of helical gears, wherein close limits are required, and the time required for selection of matched gears, high manufacturing costs result. This condition is particularly true in transmission gearing for motor vehicles where a plurality of gear sets are mounted on a pair of shafts.

In order to use helical gears in which the tooth thickness is beyond the close limits formerly required to prevent offensive back lash noise and to eliminate the careful matching of gear sets, I propose to provide a transmission mechanism wherein the gears are mounted so that the centers of the gears in meshing pairs can be adjusted relatively after they are assembled and thereby position them so that backlash is within required limits.

Another object of my invention is to provide a quiet transmission mechanism for motor vehicles wherein back lash is maintained within a desired minimum range through regulating the distance between the centers of gears in meshing pairs.

A further object of the invention is to provide a transmission wherein helical meshing gears are arranged in pairs and carried by two shafts, one of which is adjustable after assembly to regulate the distance between the centers of the meshing gears in each pair.

Other objects of the invention will appear from the following description taken in connection with the drawing, which forms a part of this specification, and in which.

Figure 1:
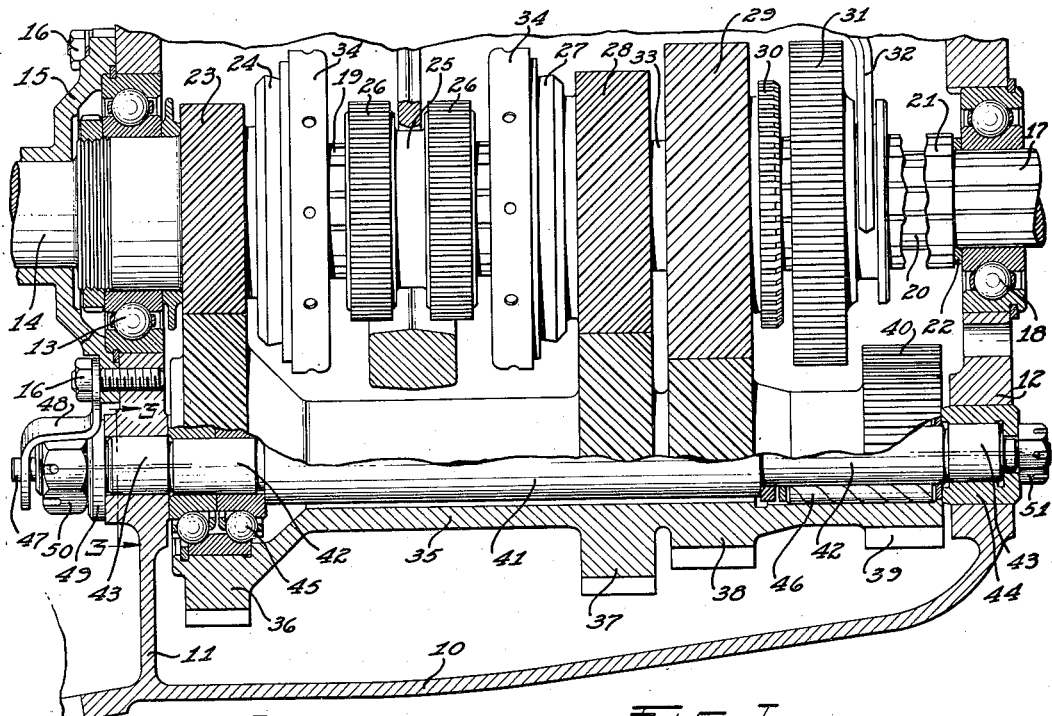
Fig. 1 is a fragmentary sectional view of a transmission mechanism having my invention incorporated therewith.
Figure 2:
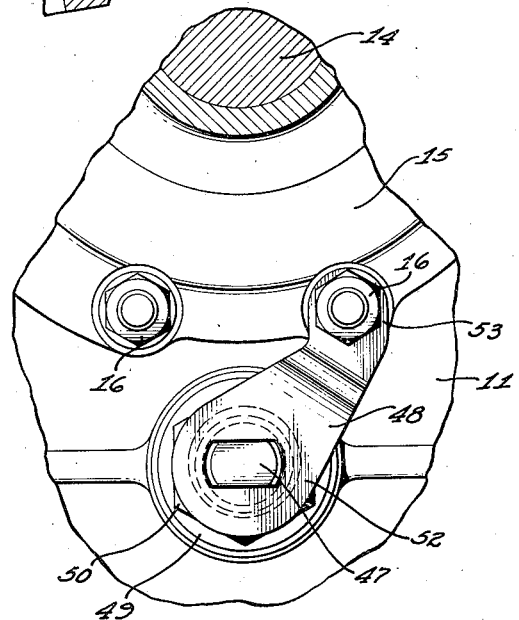
Fig. 2 is a fragmentary end elevation of the structure shown in Fig. 1.

Referring to the drawing, 10 illustrates a transmission casing, adapted to be arranged between the clutch and propeller shaft, not shown, and having a front wall 11 and a rear wall 12.

The front wall is suitably bored out for the reception of a ball thrust bearing 13 which carries the rear end of the driving shaft 14. A suitable cover 15 is bolted at 16 to the front wall of the transmission casing and serves to retain the bearing race in position with the casing.

The driven shaft, at its rear end, is recessed or bored out to receive the forward end of a transmission main shaft or driven shaft 17 which is supported in the wall 12 of the casing by a bearing 18. The forward end of the driven shaft is splined, as indicated at 19, and the rear end thereof is also splined, as indicated at 20. Surrounding the splined portion 20 of the driven shaft is a splined sleeve 21 and a spacing shim 22.

Fixed or formed on the rear end of the driving shaft is a helical gear 23 and a synchronizer cone 24. Mounted to be moved axially on the splined portion 19 of the driven shaft is a positive clutch member 25 having a pair of toothed surfaces 26 fixed to or formed therewith, such toothed surfaces being movable into engagement with teeth formed internally of the synchronizer cone 24 and a synchronizer cone 27 fixed to a helical gear 28 which is rotatably mounted on the driven shaft 17. Another helical gear 29 is rotatably mounted on the driven shaft 17 and has teeth 30 formed at one end thereof which are engageable by internal teeth formed on the spur gear 31 splined to the sleeve 21 and shiftable axially through means of a yoke 32. Intermediate the helical gears 28 and 29 is a spacer shim 33. 34 indicates a pair of members splined to the portion 19 of the driven shaft and axially movable thereon, such members cooperating with the cone members 24 and 27 to synchronize the associated gears prior to engagement of the positive clutch teeth 26.

A counter shaft 35 is located within the casing and is in the form of a sleeve having gears 36, 37, 38 and 39 formed thereon. The gears 36, 37 and 38 are of the helical type and are arranged to mesh respectively with gears 23, 28 and 29. The gear 39 is of the spur type and meshes with a gear 40 with which the spur gear 31 is adapted to be moved into engagement to provide a reverse drive from the driving shaft 14 to the driven shaft 17. As the percentage of motor vehicle operation in reverse gear is very small, I prefer to form such drive through means of spur gears as the noise resulting from this source is not objectionable.

The pair of helical gears 23 and 36 are in constant mesh, the pair of helical gears 37 and 28 are in constant mesh and the pair of helical gears 38 and 29 are in constant mesh. Direct or high speed drive from the driving shaft to the driven shaft is had by moving the clutch 25 into engagement with the teeth of the cone 24. In order to obtain a reduced or second speed driving relation between the shaft 14 and the shaft 17, the clutch 25 is shifted into engagement with the teeth of the cone 27 whereby the pairs of gears 37 and 38, the counter shaft and the pair of gears 23 and 36 will form the driving connection. When third speed drive is desired, the gear 31 is shifted so that its internal teeth mesh with the teeth 30 on gear 29 and rotation is imparted to the gear 29 by means of gear 38 mounted on the counter shaft driven through the meshing gears 23 and 36. Reverse driving connection between the shaft 14 and shaft 17 is obtained through the rotation of the sleeve by means of meshing gears 23 and 36 and the spur gears 39 and 40 and the gear 31 which is shifted to mesh with the gear 40, the gear 31 being splined to the sleeve 21 which is splined to the shaft 17.

Ordinarily the counter shaft herein described is rotatably mounted on a shaft, as indicated at 41, extending through the crank case and fixed so that the centers between the pairs of meshing gears cannot be adjusted. Reference may be had to my co-pending application Serial Number 639,197, filed October 24, 1932, for a more complete description of a transmission having the characteristics set forth in the foregoing part of the description.

Because of the inability to shift the centers of the meshing gears in each pair of gears relatively, extreme care must be given to the proper matching of gears even when the finished teeth are within specified limits sufficient to prevent objectionable back lash noise. This selection of properly matched gears requires considerable time in the fabrication of a transmission mechanism. The close limits required under such circumstances causes very careful gear forming operation and even then, because of the human element, many gears have to be scrapped because they are outside of the limits which can be allowed to prevent objectionable back lash noise. This is particularly true with helical gears which have been adapted for transmissions because of their quietness. Because of the quietness of these helical gears, back lash noise becomes noticeable.

Figure 3:
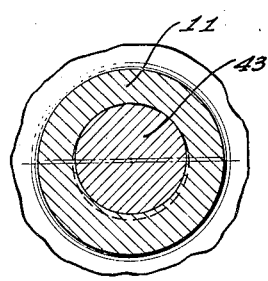
Fig. 3 is a sectional view taken on line 3—3 of Fig. 1, illustrating the eccentric mounting of the shaft supporting the counter shaft.

It is the purpose of this invention to mount gears in a transmission so that the centers between the gears in each pair of meshing gears can be adjusted after assembly of the transmission in order to arrange the gears so that back lash is established within desired limits. As one means of attaining this result, the shaft 41 is provided with concentric mounting portions 42 and with eccentric bearing portions 43, the centers being indicated by dotted lines in Fig. 3. The forward eccentric portion extends through an opening in the wall 11 and the rear eccentric portion is mounted in a removable bearing 44 extending into an opening in the wall 12 of the casing. The interior diameter of the forward end of the sleeve is enlarged for the reception of a roller bearing means 45 which is associated with the forward concentric mounting portion 42 of the shaft 41. The rear end of the sleeve 35 is enlarged to receive roller bearing means 46 which is associated with the rear concentric mounting portion of the shaft 41. In this manner, the counter shaft 35 is rotatably mounted upon the concentric mounting portions 42 formed on the shaft 41. As the shaft 41 is provided with eccentric bearing portions 43, rotation of the shaft will shift the mounting portions 42 to move the gears carried by the sleeve 35 toward or away from the gears with which they mesh and hence the centers between the pairs of meshing gears can be regulated as desired to limit back lash.

In order to rotatably adjust the shaft 41, I provide the forward end thereof with an extension 47 having two flat sides for engagement by a tool or fastening means 48. This end of the shaft preferably extends through the wall 11 of the casing so that the shaft can be adjusted exteriorly of the casing after the transmission gearing has been assembled therein. On the shaft is a washer 49 which engages with the wall 11 and a nut 50 is screwed upon a threaded portion of the shaft extension adjacent the washer. At the rear end of the shaft is a threaded portion extending through the bearing member 44 on which is screwed a nut 51. By screwing up nut 51 on the threaded rear end of the shaft 41 the bearing 44 is engaged with and positions the countershaft 35 axially on the shaft 41. Screwing the nut 50 on the threaded front end of shaft 41 against the washer while in engagement with the casing 11 will draw the shaft 41 forwardly and locate it axially in desired position.

The locking member 48 can take various forms but, in the present embodiment, a flat piece of metal bent to angular form is utilized. One end 52 of the metal is arranged to telescope the extended portion 47 of the supporting shaft and is provided with an opening corresponding to the shape thereof. The other end 53 is provided with an opening arranged so that one of the bolts 16 fastening the plate 15 to the wall 11 can project therethrough and thus clamp the fastening means against the wall 11 of the casing. By removing such bolt, the fastening means can be assembled or removed. Obviously, the opening in the end 52 of this fastening means will have to be disposed at various angles in order to lock the shaft in its various positions of rotational adjustment and, with the described embodiment of fastening means, members having the openings in the end 52 at various angles will have to be employed and the proper one selected for the adjustment.

With this means of adjusting the position of the counter shaft so as to vary the distance between the centers of the gears in each pair, I am able to readily take up back lash after the transmission gearing has been assembled. By taking up back lash in this manner, there will be no objectionable noise and a very quiet operating transmission gear structure is provided. Furthermore, the necessity for extremely close tooth limits for the gears and the necessity for extreme care in matching the gears is not so urgent when back lash can be taken out after the gearing is assembled, and consequently, besides providing quiet transmission, the cost of fabricating the transmission is materially reduced.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. Transmission mechanism comprising a casing, a rotatably adjustable supporting shaft having eccentric mounting portions carried by the casing and concentric bearing portions intermediate the eccentric portions, a sleeve rotatably mounted on the concentric portions of said shaft, gears fixed in axially spaced relation on said sleeve, shaft means carried by the casing and having a stationary axis in parallelism with the axis of said supporting shaft, gears mounted on said shaft means in meshing relation with said sleeve gears, the rotative adjustment of said supporting shaft shifting the axis of said sleeve gears relative to said gears with which they mesh so that back lash is within close limits, and means retaining said supporting shaft in desired adjusted position to maintain the meshing gears in a relation having the desired close limits of back lash.

2. Transmission mechanism comprising a casing, a rotatably adjustable supporting shaft projecting through said casing, said shaft having eccentric mounting portions carried by the casing and concentric bearing portions intermediate the eccentric portions, a sleeve rotatably mounted on the concentric portions of said shaft, shaft means carried by the casing having a fixed axis parallel with the axis of said sleeve, gears mounted on said shaft means in mesh with said sleeve gears, the rotative adjustment of said supporting shaft shifting the axis of said sleeve gears relative to said gears on the shaft means with which they mesh so that back lash is held within close limits, and retainer means engaging an end of said supporting shaft and fixed to said casing for securing the shaft in any position in its range of adjustment to maintain the meshing gears in the back lash relation specified.

3. Transmission mechanism comprising a casing, a rotatably adjustable supporting shaft having eccentric mounting portions carried by the casing and concentric bearing portions intermediate the eccentric portions, a sleeve telescoping said supporting shaft and rotatably mounted thereon, bearing means between the ends of the sleeve and the supporting shaft, shaft means carried by the casing with the axis fixed and in parallel relation with the sleeve axis, gears mounted on the shaft means in constant mesh with said sleeve gears, the rotative adjustment of said supporting shaft shifting the axis of said sleeve gears relative to the gears with which they mesh to maintain close back lash limits, and means for retaining said supporting shaft in any position of rotative adjustment to maintain the selected back lash adjustment of said meshing gears.

4. Transmission mechanism comprising a shaft having eccentric supporting bearings and intermediate concentric bearings, a hollow counter shaft rotatably mounted on the concentric shaft bearings, axially spaced helical gears fixed on said counter shaft, shaft means having a fixed axis in parallel relation with the axis of said counter shaft, helical gears on said shaft means meshing with the gears on said counter shaft, rotation of said supporting shaft shifting the axis of said counter shaft gears relative to the gears with which they are in mesh to maintain close limits of back lash therebetween, and means for locking the supporting shaft in any position of rotation to hold the axis of the meshing gears in desired close back lash relation.

WALTER R. GRISWOLD.